US012705758B1

(12) United States Patent
Belhakimi

(10) Patent No.: US 12,705,758 B1
(45) Date of Patent: Aug. 11, 2026

(54) SYSTEMS AND METHODS FOR OBJECT TRACKING IN VIDEOS

(71) Applicant: GoPro, Inc., San Mateo, CA (US)

(72) Inventor: Amine Belhakimi, Paris (FR)

(73) Assignee: GoPro, Inc., San Mateo, CA (US)

( * ) Notice: Subject to any disclaimer, the term of this patent is extended or adjusted under 35 U.S.C. 154(b) by 305 days.

(21) Appl. No.: 18/435,729

(22) Filed: Feb. 7, 2024

(51) Int. Cl.

| | |
|---|---|
| ***G06T 7/20*** | (2017.01) |
| ***G06T 7/60*** | (2017.01) |
| ***G06V 10/75*** | (2022.01) |
| ***G06V 20/40*** | (2022.01) |

(52) U.S. Cl.
CPC .................. *G06T 7/20* (2013.01); *G06T 7/60* (2013.01); *G06V 10/751* (2022.01); *G06V 20/40* (2022.01)

(58) Field of Classification Search
None
See application file for complete search history.

(56) References Cited

U.S. PATENT DOCUMENTS 6,389,168 B2 * 5/2002 Altunbasak ............. G06T 9/005 348/700
2015/0071529 A1 * 3/2015 Yokoi .................. G06V 10/774 382/159
2015/0131851 A1 * 5/2015 Bernal .................... G06T 7/248 382/103
2018/0359414 A1 * 12/2018 Wang ........................ G06T 7/20
2019/0149747 A1 * 5/2019 Keskikangas ............. G06T 7/11 348/36
2022/0215560 A1 * 7/2022 Ji ............................. G06T 7/90
2022/0253988 A1 * 8/2022 Miles ...................... G06T 3/047
2022/0301292 A1 * 9/2022 Nakao ................. G06V 10/255

FOREIGN PATENT DOCUMENTS

CN 116343154 A * 6/2023 ............. G06V 20/56

* cited by examiner

*Primary Examiner* — SJ Park
*Assistant Examiner* — Caroline E. Depalma
(74) *Attorney, Agent, or Firm* — Esplin & Associates, PC

(57) ABSTRACT

An object may be tracked through a video using the sizes of objects depicted in the video. The size of an object to be tracked (tracking object) may be determined using the depiction of the tracking object in a video frame. In a subsequent video frame, an object that has (1) a size that is closest to the tracking size, and (2) a size that differs from the tracking size by less than a threshold amount may be identified to be the tracking object. The tracking size may be updated with the size of the object identified to be the tracking object for use in the next video frame. This enables objects to be tracked simply and quickly by using the sizes of objects. The video frames may be framed for presentation using the positions of the tracking object in the video frames.

20 Claims, 5 Drawing Sheets

Detect Objects in Video Frames 302

For Initial Video Frame ($F_0$):

Filter the Objects 312

Select the Tracking Object 314

Save the Tracking Size of the Tracking Object 316

For Subsequent Video Frames ($F_{1, 2, 3, \ldots, n}$):

Filter the Objects 322

Determine the Differences between the Tracking Size and the Sizes of Objects 324

For the Object That Is Closest in Size to the Tracking Object, Compare the Size Difference to a Threshold 326

If Less than the Threshold, Identify the Object as the Tracking Object and Update the Tracking Size 328A If Greater than the Threshold, Skip Identification of the Tracking Object or Select a New Tracking Object 328B Detect Objects in Video Frames 302

For Initial Video Frame ($F_0$):

Filter the Objects 312

Select the Tracking Object 314

Save the Tracking Size of the Tracking Object 316

For Subsequent Video Frames ($F_{1, 2, 3, \ldots, n}$):

Filter the Objects 322

Determine the Differences between the Tracking Size and the Sizes of Objects 324

For the Object That Is Closest in Size to the Tracking Object, Compare the Size Difference to a Threshold 326

If Less than the Threshold, Identify the Object as the Tracking Object and Update the Tracking Size 328A If Greater than the Threshold, Skip Identification of the Tracking Object or Select a New Tracking Object 328B

FIG. 3

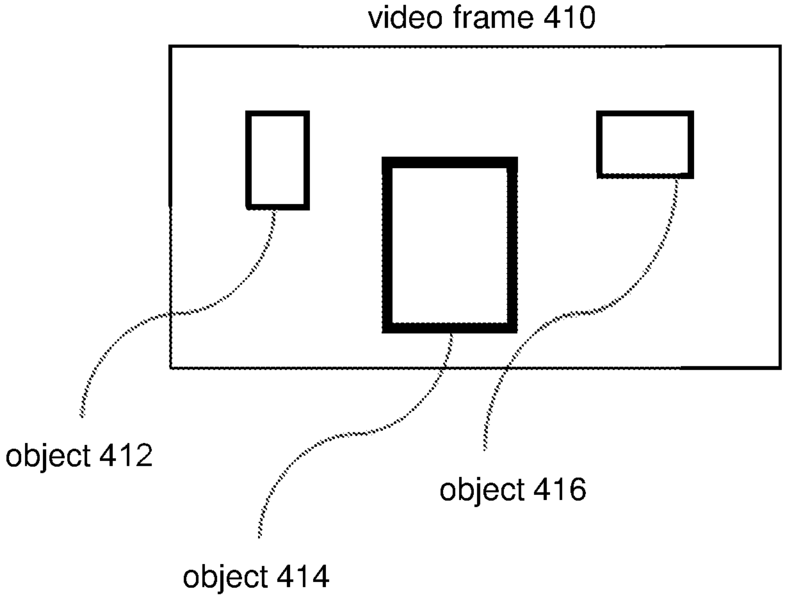
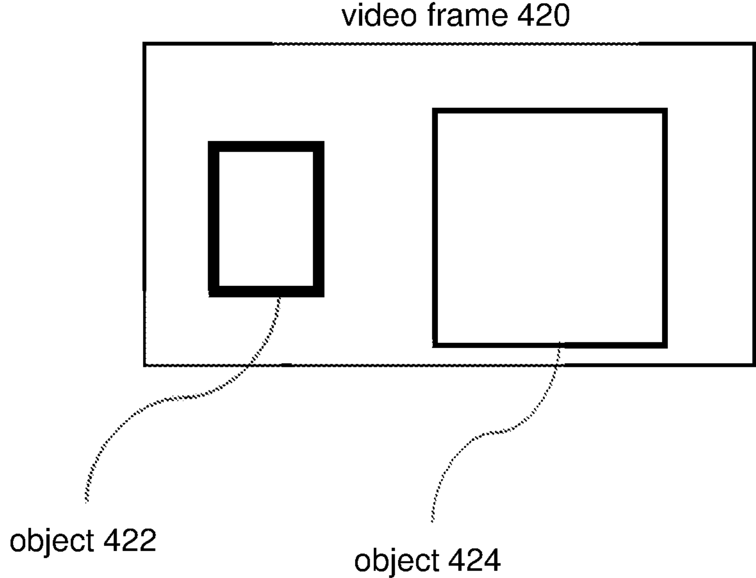
FIG. 4

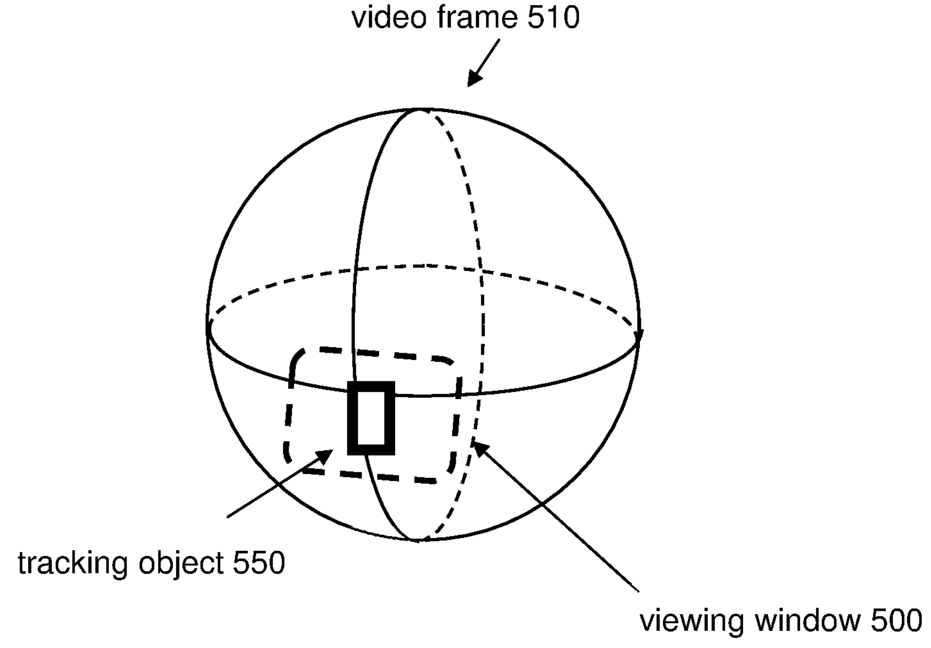
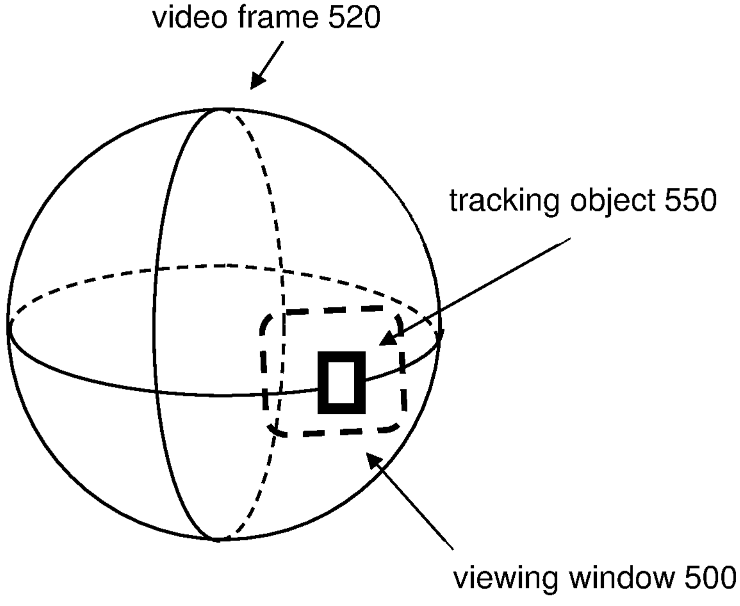
FIG. 5

SYSTEMS AND METHODS FOR OBJECT TRACKING IN VIDEOS

FIELD

This disclosure relates to tracking an object through a video using changes in sizes of objects depicted in the video.

BACKGROUND

A video may have a wide field of view (e.g., spherical field of view). The wide field of view of the video may make it difficult to determine which parts (spatial extents) of the video contain interesting views. Manually reviewing the video to determine framing of the video may be difficult and time consuming.

SUMMARY

This disclosure relates to tracking objects in videos. Video information and/or other information may be obtained. The video information may define a video. The video may include video frames. The video frames may depict objects. A tracking object depicted in a given video frame may be selected. A tracking size of the tracking object depicted in the given video frame may be determined. Sizes of the objects depicted in a subsequent video frame may be determined. One of the objects depicted in the subsequent video frame may be identified as the tracking object based on a comparison between the tracking size of the tracking object depicted in the given video frame and the sizes of the objects depicted in the subsequent video frame and/or other information. Framing of the video for presentation may be determined based on the identification of the tracking object in the video frames and/or other information.

A system for tracking objects in videos may include one or more electronic storages, one or more processors, and/or other components. An electronic storage may store video information, information relating to videos, information relating to video frames, information relating to objects, information relating to the sizes of objects, information relating to a tracking object, information relating to the size of the tracking object, information relating to framing of the video, and/or other information.

The processor(s) may be configured by machine-readable instructions. Executing the machine-readable instructions may cause the processor(s) to facilitate tracking objects in videos. The machine-readable instructions may include one or more computer program components. The computer program components may include one or more of a video component, a selection component, a size component, a tracking component, a framing component, and/or other computer program components.

The video component may be configured to obtain video information and/or other information. The video information may define a video. The video may include video frames. The video frames may depict objects. In some implementations, the video may include a spherical video.

The selection component may be configured to select a tracking object depicted in a given video frame. In some implementations, one or more of the objects depicted in the given video frame may be filtered out from being considered as the tracking object based on classification of the object(s).

The size component may be configured to determine sizes of the objects depicted in the video frames. The size component may be configured to determine a tracking size of the tracking object depicted in the given video frame. The size component may be configured to determine sizes of the objects depicted in a subsequent video frame. In some implementations, the subsequent video frame may depict a given object having a given size.

The tracking component may be configured to identify one of the objects depicted in a video frame as the tracking object. The tracking component may be configured to identify one of the objects depicted in the subsequent video frame as the tracking object based on a comparison between the tracking size of the tracking object depicted in the given video frame and the sizes of the objects depicted in the subsequent video frame, and/or other information.

In some implementations, one or more of the objects depicted in the subsequent video frame may be filtered out from being considered as the tracking object based on classification of the object(s).

In some implementations, an object depicted in the subsequent video frame may be identified as the tracking object based on a difference between the size of the object and the tracking size of the tracking object being less than a threshold size and/or other information. An object may not be identified as the tracking object based on the difference between the size of the object and the tracking size of the tracking object being greater than the threshold size and/or other information.

In some implementations, an object in the subsequent video frame with a smallest size difference with the tracking size of the tracking object depicted in the given video frame may be identified as the tracking object in the subsequent video frame.

In some implementations, the tracking size may be updated with the size of the object identified as the tracking object in the subsequent video frame for next identification of the tracking object.

In some implementations, responsive to none of the objects depicted in the subsequent video frame being identified as the tracking object, a new tracking object may be selected in the subsequent video frame. In some implementations, responsive to none of the objects depicted in the subsequent video frame being identified as the tracking object, the identification of the tracking object for the subsequent video frame may be skipped.

The framing component may be configured to determine framing of the video for presentation. The framing of the video for presentation may be determined based on the identification of the tracking object in the video frames and/or other information. In some implementations, the determination of the framing of the video for presentation based on the identification of the tracking object in the video frames may include positioning of a viewing window for the video to include the tracking object.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of “a,” “an,” and “the” include plural referents unless the context clearly dictates otherwise.

BRIEF DESCRIPTION OF THE DRAWINGS

FIG. 3 illustrates an example flow diagram for tracking objects in videos.

FIG. 4 illustrates example detection of objects depicted in video frames.

FIG. 5 illustrates example framing of video frames.

DETAILED DESCRIPTION

Figure 1:
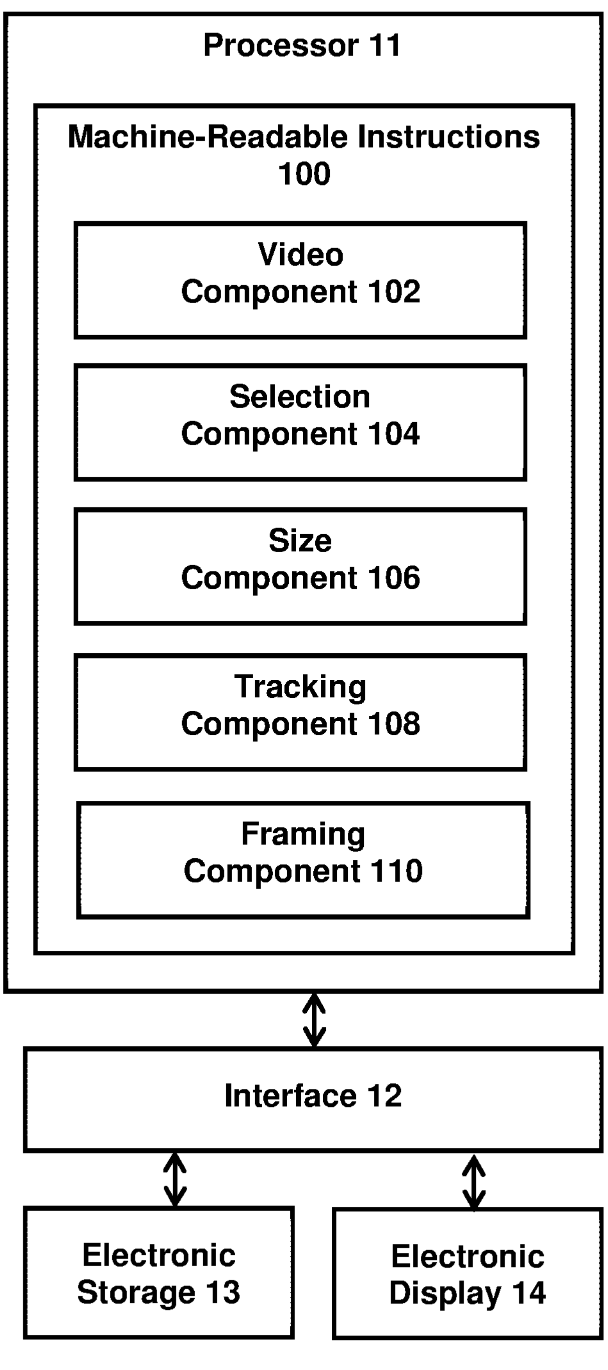
FIG. 1 illustrates an example system for tracking objects in videos.

FIG. 1 illustrates a system 10 for tracking objects in videos. The system 10 may include one or more of a processor 11, an interface 12 (e.g., bus, wireless interface), an electronic storage 13, an electronic display 14, and/or other components. Video information and/or other information may be obtained by the processor 11. Video information and/or other information may be obtained by the processor 11. The video information may define a video. The video may include video frames. The video frames may depict objects. A tracking object depicted in a given video frame may be selected by the processor 11. A tracking size of the tracking object depicted in the given video frame may be determined by the processor 11. Sizes of the objects depicted in a subsequent video frame may be determined by the processor 11. One of the objects depicted in the subsequent video frame may be identified by the processor 11 as the tracking object based on a comparison between the tracking size of the tracking object depicted in the given video frame and the sizes of the objects depicted in the subsequent video frame and/or other information. Framing of the video for presentation may be determined by the processor 11 based on the identification of the tracking object in the video frames and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to videos, information relating to video frames, information relating to objects, information relating to the sizes of objects, information relating to a tracking object, information relating to the size of the tracking object, information relating to framing of the video, and/or other information.

The electronic display 14 may refer to an electronic device that provides visual presentation of information. The electronic display 14 may include a color display and/or a non-color display. The electronic display 14 may be configured to visually present information. The electronic display 14 may present information using/within one or more graphical user interfaces. For example, the electronic display 14 may present video information, information relating to videos, information relating to video frames, information relating to objects, information relating to the sizes of objects, information relating to a tracking object, information relating to the size of the tracking object, information relating to framing of the video, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. The video may include video frame(s) that define/contain the visual content of the video. Video frame (s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video (s)) with a field of view may be captured by an image capture device during a capture duration. A field of view of visual content may define a field of view of a scene captured within the visual content. A capture duration may be measured/ defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the processor 11, the interface 12, the electronic storage 13, and/or the electronic display 14 of the system 10 may be carried by the housing of the image capture device. The image capture device may carry other components, such as one or more optical elements and/or one or more image sensors.

An image capture device may refer to a device that captures visual content. An image capture device may capture visual content in the form of images, videos, and/or other forms. An image capture device may refer to a device for recording visual information in the form of images, videos, and/or other media. An image capture device may be a standalone device (e.g., camera, image sensor) or may be part of another device (e.g., part of a smartphone, tablet).

A video with a wide field of view (e.g., spherical video, panoramic video) may depict a large portion of a scene. The wide field of view of the video may make it difficult for a user to determine which spatial extent of the scene depicted within the video contains an interviewing view. The video may be framed using positions of an object in the video. The object may be tracked through the video, with changes in the position of the object causing changes in video framing. Object tracking, however, may be computationally expensive.

The present disclosure enables fast and efficient object tracking in videos. An object may be tracked through a video using the sizes of objects depicted in the video. The size of an object to be tracked (tracking object) may be determined using the depiction of the tracking object in a video frame. For example, the size of the tracking object (tracking size) may be determined as/based on the diagonal length of a bounding box that contains the tracking object. In a subsequent video frame, an object that has (1) a size that is closest to the tracking size, and (2) a size that differs from the tracking size by less than a threshold amount may be identified to be the tracking object. The tracking size may be updated with the size of the object identified to be the tracking object for use in the next video frame. This enables objects to be tracked simply and quickly by using the sizes of objects. An object may be tracked as the tracking object even when the sizes of the object changes through the video. An object may be tracked as the tracking object even when it is not the biggest or the smallest object. The video frames may be framed for presentation using the positions of the tracking object in the video frames.

FIG. 3 illustrates an example flow diagram for tracking objects in videos. In step 302, objects depicted in video frames of a video may be detected. The objects depicted in the video frames may be detected using one or more projections. For example, the video frames may be projected using an equirectangular projection to detect the objects depicted in the video frames. An initial video frame ($F_0$) of the video may be used to start the tracking process. The initial video frame of the video may refer to the first video frame in the video or the video frame with which object tracking is started. The initial video frame of the video may refer to the video frame of the video with which object tracking is initialized. The initial video frame may depict one or more objects. In step 312, the objects depicted in the initial video frame may be filtered. The objects may be filtered based on the classification of objects to identify objects of one or more types that are of interest. The classification of objects may determine the types of the objects. Objects that are of the type(s) of interest may be analyzed in the object tracking. Objects that are of the type(s) of non-interest may be ignored in the object tracking. In step 314, an object (an object that is of a type of interest) depicted in the initial video frame may be selected as the tracking object for the video. The object may be selected as the tracking object manually (e.g., by a user) or automatically (e.g., based on one or more criteria). For example, a particular object depicted in the initial video frame may be selected by a user as the tracking object. As another example, an object of interest that has the largest size (e.g., largest diagonal size) in the initial video frame may be selected as the tracking object. The size of the object selected as the tracking object may be determined and saved as the tracking size 316.

The tracking size may be used to identify the tracking object in the subsequent video frames ($F_{1, 2, 3, \ldots, n}$) of the video. The subsequent video frames of the video may refer to video frames after/following the initial video frame. The subsequent video frames of the video may refer to video frames captured after the initial video frame and/or video frames that are played after the initial video frame. The steps listed for the subsequent video frames may be performed on individual video frames. The steps listed for the subsequent video frames may be performed on one subsequent video frame before being performed on another (e.g., next) subsequent video frame.

In step 322, the objects depicted in a subsequent video frame may be filtered. The objects may be filtered based on the classification of objects to identify objects of one or more types that are of interest. Objects that are of the type(s) of interest may be analyzed in the object tracking. Objects that are of the type(s) of non-interest may be ignored in the object tracking. In step 324, the sizes of the objects (objects that are of type(s) of interest) depicted in the subsequent video frames may be determined and compared with the tracking size to determine the differences between the tracking size and the sizes of the objects depicted in the subsequent video frame. In step 326, the differences between the tracking size and the sizes of the objects depicted in the subsequent video frame may be used to identify the object that is closest in size to the tracking object. The difference between size of the object that is closest in size to the tracking object (closest size) and the tracking size may be compared to a threshold to determine whether this object will be identified as the tracking object in the subsequent video frame.

In step 328A, if the difference between the closest size and the tracking size is less than the threshold, the object that is closest in size to the tracking object may be identified as the tracking object in the subsequent video frame. The tracking size may be updated with the size of the object identified as the tracking object in the subsequent video frame for use with the subsequent video frame that is analyzed. In step 328B, if the difference between the closest size and the tracking size is greater than the threshold, identification of the tracking object in the subsequent video frame may be skipped or a new tracking object may be selected from among the objects depicted in the subsequent video frame. The new tracking object may be selected manually or automatically. For example, the user may be prompted to select a particular object depicted in the subsequent video frame as the new tracking object. As another example, an object of interest that has the largest size (e.g., largest diagonal size) in the subsequent video frame may be selected as the new tracking object. The size of the newly selected tracking object may be saved as the tracking size for use with the subsequent video frame that is analyzed. Locations of the tracking object in the video frames may be saved and/or output. For example, the location of the center of the tracking object in the video frames, the location of a corner of the bounding box for the tracking object in the video frames, the size of the bounding box for the tracking object in the video frames, and/or other information relating to the location of the tracking object in the video frames may be saved and/or output. In some implementations, locations of all objects detected within the video frames may be saved and/or output, with one of the objects marked as the tracking object.

FIG. 4 illustrates example detection of objects depicted in video frames. A video frame 410 may be an initial video frame. The video frame 410 may depict objects 412, 414, 416. One of the objects 412, 414, 416 may be manually or automatically selected as a tracking object. For example, the object 414 may be selected as the tracking object. The size of the object 414 may be saved as the tracking size.

A video frame 420 may be a subsequent video frame. The video frame 420 may depict objects 422, 424. The sizes of the objects 422, 424 may be determined. One of the objects 422, 424 may be identified to be the tracking object (same object as the object 414) based on comparison of the tracking size (the size of the object 414 depicted in the video frame 410) and the sizes of the objects 422, 424. The object (1) that is closest in size to the tracking size, and (2) that differs in size from the tracking size by less than a threshold size may be identified as the tracking object. For example, in the video frame 420, the object 422 may be identified as the tracking object. The object 422 may be closer in size to the tracking size than the object 424, and the difference between the size of the object 422 and the tracking size (the size of the object 414 depicted in the video frame 410) may be less than a threshold size.

FIG. 5 illustrates example framing of video frames 510, 520. The video frames 510, 520 may be two different video frames in a video. The video frames 510, 520 may depict a tracking object 550. The tracking object 550 in the video frames 510, 520 may be identified using the sizes of the tracking object 550 in the video frames 510, 520 and a tracking size. The video frames 510, 520 may be framed for presentation based on the identification of the tracking object 550 in the video frames 510, 520. The video frames 510, 520 may be framed by positioning a viewing window 500 within the video frames 510, 520. The viewing window 500 may be positioned within the video frames 510, 520 to include the tracking object 550 within the viewing window 500. The viewing window 500 may be positioned to include the tracking object 550 at the center/in the center area of the viewing window 500 or at other positions in the viewing window 500.

Referring back to FIG. 1, the processor 11 (or one or more components of the processor 11) may be configured to obtain information to facilitate tracking objects in videos. Obtaining information may include one or more of accessing, acquiring, analyzing, capturing, determining, examining, generating, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate tracking objects in videos. The machine-readable instructions 100 may include one or more computer program components. The machine-readable instructions 100 may include one or more of a video component 102, a selection component 104, a size component 106, a tracking component 108, a framing component 110, and/or other computer program components.

The video component 102 may be configured to obtain video information and/or other information. In some implementations, the video component 102 may obtain video information based on user interaction with a user interface/application (e.g., video editing application, video player application), and/or other information. For example, a user interface/application may provide option(s) for a user to play and/or edit videos. The video information for a video may be obtained based on the user's selection of the video through the user interface/video application. Other selections of a video for retrieval of video information are contemplated.

The video information may define a video. A video may have a progress length. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers of videos are contemplated.

The video may include visual content viewable as a function of progress through the progress length of the video. The visual content of the video may be contained/defined/included within video frames of the video. The visual content may have a field of view. A field of view of a video/visual content may refer to a field of view of a scene captured within the video/visual content (e.g., within video frames). A field of view of a video/visual content may refer to the extent of a scene that is captured within the video/visual content.

A video may include a wide field of view video. A wide field of view video may refer to a video with a wide field of view. A wide field of view may refer to a field of view that is larger/wider than a threshold field of view/angle. For example, a wide field of view may refer to a field of view that is larger/wider than 60-degrees. In some implementations, a video may include a spherical video. A spherical video may have a spherical field of view. Spherical field of view may include 360-degrees of capture. Spherical field of view may include views in all directions surrounding the image capture device. The spherical video may include spherical visual content (visual content having spherical field of view) viewable as a function of progress through the progress length of the video. Spherical field of view may include a complete sphere or a partial sphere. Other fields of view of videos are contemplated. A wide field of view video may include and/or may be associated with spatial audio.

A video may include video frames. The video frames may depict objects. All of some of the video frames of the video may depict one or more objects. An object may refer to a thing that can be seen. An object may include a living object or a non-living object. An object may include a static object (e.g., non-moving object, non-changing object) or a dynamic object (e.g., moving object, changing object). An object may refer to the entirety of a thing. For example, an object may include a person, an animal, a piece of equipment, a vehicle, a structure, a scenery, and/or other objects. An object may refer to a part of a thing. For example, an object may include a part of a person (e.g., head, face), a part of an equipment, a part of a vehicle, a part of a structure, a part of a scenery, and/or other objects.

The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

Video information may be stored within a single file or multiple files. For example, video information defining a video may be stored within a video file, multiple video files, a combination of different files (e.g., a visual file and an audio file), and/or other files. Video information may be stored in one or more formats or containers.

The selection component 104 may be configured to select a tracking object depicted in a video frame. A tracking object may refer to an object to be tracked in the video. A tracking object may refer to an object that is to be identified in other video frames. Selecting a tracking object depicted in a video frame may include choosing, identifying, marking, picking, and/or otherwise selecting the tracking object depicted in the video frame. Selecting a tracking object depicted in a video frame may include selecting an object depicted in the video frame as the tracking object. Selecting a tracking object depicted in a video frame may include detection of objects depicted in the video frame and selection of one of the objects depicted in the video frame as the tracking object. In some implementations, a video frame may be projected using an equirectangular projection to detect the objects depicted in the video frame. Use of other projections is contemplated.

The selection component 104 may be configured to select a tracking object depicted in one video frames or multiple video frames of the video. The selection component 104 may be configured to select a tracking object depicted in an initial video frame of the video. For example, referring to FIG. 4, the object 414 depicted in the video frame 410 may be selected as the tracking object. The selection component 104 may be configured to select a tracking object depicted in a subsequent video frame of the video. For example, referring to FIG. 4, the object 422 depicted in the video frame 420 may be selected as the tracking object.

The selection component 104 may be configured to select a tracking object depicted in a video frame manually and/or automatically. Manual selection of a tracking object may include user selection of an object depicted in a video frame as the tracking object. A user may interact with one or more user interfaces to select an object depicted in a video frame as the tracking object. Automatic selection of a tracking object may include selection of an object depicted in a video frame based on one or more selection criteria. Automatic selection of a tracking object may include selection of an object depicted in a video frame based on one or more characteristics of the object. For example, an object may be selected as the tracking object based on the type of the object, the size of the object, and/or other characteristics of the object. For instance, the largest object of interest depicted in a video frame may be automatically selected as the tracking object.

In some implementations, one or more of the objects depicted in the video frame may be filtered out from being considered as the tracking object based on classification of the object(s). Classification of an object may refer to action or process of classifying the object based on one or more characteristics of the object. Classification of an object may refer to action or process of identifying the type (category) of the object. The type of the object may be used to filter the object out from being selected as the tracking object. For example, an object may be filtered out based on the object not being an object of interest. An object of interest may refer to an object that is of interest for tracking. An object of interest may be defined manually or automatically. Objects of non-interest depicted in the video frame may be automatically filtered out from being selected as the tracking object. For example, objects of interest may include persons or faces, and other types of objects depicted in the video frame may not be considered as a potential tracking object. Other types of objects of interest are contemplated. Filtering out objects from being considered as the tracking object may simplify the tracking process. Filtering out objects from being considered as the tracking object may reduce the amount of analysis/processing needed to be performed to select the tracking object.

The size component 106 may be configured to determine sizes of the objects depicted in the video frames. The size component 106 may be configured to determine sizes of the objects depicted in an initial video frame, one or more subsequent video frames, and/or other video frames. Determining the size of an object may include ascertaining, calculating, computing, establishing, finding, setting, and/or otherwise determining the size of the object. The size of an object depicted in a video frame may refer to the relative extent, the overall dimensions/magnitude, and/or the shape of the object depicted in the video frame. The size of an object depicted in a video frame may refer to how big/how much space (e.g., pixels) is taken up by the depiction of the object in the video frame. The size of an object depicted in a video frame may include the height, the width, the diagonal length, and/or other dimensions of the depiction of the object. For example, the size of the object depicted in a video frame may refer to the diagonal length of a bounding box that contains the object.

The size component 106 may be configured to determine a tracking size of the tracking object depicted in a video frame. Determining a tracking size of the tracking object may include ascertaining, calculating, computing, establishing, finding, setting, and/or otherwise determining the tracking size of the tracking object. The tracking size may refer to the size of the tracking object. The tracking size may refer to the size of an object that is to be tracked in the video. The tracking size may refer to the size of an object that is used to identify the tracking object in other video frames. The size component 106 may determine the tracking size by determining the size of the tracking object. The size component 106 may determine the tracking size by updating the value (s) of the tracking size with the values(s) of the size of the tracking object.

For example, after an object has been selected as the tracking object in an initial video frame, the tracking size may be set to be the same as the size of the object selected as the tracking object. After an object depicted in a subsequent video frame has been identified as being the tracking object, the tracking size may be updated (e.g., modified, changed, set) to be the same as the size of the object identified in the subsequent video frame as the tracking object. After a new object has been selected as the tracking object in a subsequent video frame, the tracking size may be updated (e.g., modified, changed, set) to be the same as the size of the object selected as the new tracking object. For example, referring to FIG. 4, the size of the object 414 may be set to be the tracking size responsive to the object 414 being selected in the video frame 410 as the tracking object.

Responsive to the object 422 being identified as being the tracking object in the video frame 420, the tracking size may be updated to be the same as the size of the object 422.

The tracking component 108 may be configured to identify one of the objects depicted in one or more subsequent video frames as the tracking object. Identifying an object depicted in a video frame as the tracking object may include choosing, detecting, determining, discerning, discovering, finding, marking, picking, selecting, spotting, and/or otherwise identifying the object depicted in the video frame as the tracking object. Identifying an object depicted in a video frame as the tracking object may include identifying the object depicted in the video frame as being the same object as the tracking object. Identifying an object depicted in a video frame as the tracking object may include determining that the object depicted in the video frame is the same object as the tracking object. Identifying an object depicted in a video frame as the tracking object may include detection of objects depicted in the video frame and identification of one of the objects depicted in the video frame as the tracking object.

A subsequent video frame may depict one or more objects. A subsequent video frame may depict objects of different sizes. A subsequent video frame may depict objects of the same. The tracking component 108 may be configured to identify an object depicted in a subsequent video frame as the tracking object based on a comparison between the tracking size of the tracking object depicted in a prior video frame and the size(s) of the object(s) depicted in the subsequent video frame, and/or other information. The comparison between the tracking size and the size(s) of the object(s) depicted in the subsequent video frame may be used to identify an object depicted in the subsequent video frame as the tracking object. The comparison between the tracking size and the size(s) of the object(s) depicted in the subsequent video frame may be used to determine the difference between the tracking size and the size(s) of the object(s) depicted in the subsequent video frame, and the difference between the tracking size and the size(s) of the object(s) depicted in the subsequent video frame may be used to identify an object depicted in the subsequent video frame as the tracking object. The difference between the tracking size and the size(s) of the object(s) depicted in the subsequent video frame may be determined as a size value, a percentage, and/or other values.

In some implementations, an object depicted in the subsequent video frame may be identified as the tracking object based on a difference between the size of the object and the tracking size of the tracking object being less than a threshold size and/or other information. Based on the size of the object depicted in the subsequent video frame being bigger or smaller than the tracking size by less than a threshold size, the object may be identified as the tracking object.

In some implementations, an object depicted in the subsequent video frame may not be identified as the tracking object based on the difference between the size of the object and the tracking size of the tracking object being greater than the threshold size and/or other information. Based on the size of the object depicted in the subsequent video frame being bigger or smaller than the tracking size by greater than a threshold size, the object may be identified as the tracking object.

In some implementations, the threshold size may be manually set (e.g., by a user). In some implementations, the threshold size may be automatically set (e.g., by default, based on one or more criteria). In some implementations, the same threshold size may be used for different types of tracking objects. In some implementations, different threshold sizes may be used for different types of tracking objects.

In some implementations, an object in the subsequent video frame with the smallest size difference with the tracking size of the tracking object depicted in a prior video frame may be identified as the tracking object in the subsequent video frame. The object in the subsequent video frame that has the size that is closest to the tracking size may be identified as the tracking object in the subsequent video frame.

In some implementations, multiple information relating to the size of the object may be compared for identification of the tracking object in the subsequent video frame. For example, the diagonal lengths of the object depicted in the subsequent video frame may be compared to the diagonal length of the tracking object to identify the object with the closest diagonal length to the tracking object as the tracking object in the subsequent video frame. Responsive to multiple objects in the subsequent video frame having the same diagonal length and being closest to the tracking object diagonal length, other aspects of the tracking size may be compared to identify the tracking object among the multiple objects. For example, height, width, and/or shape of the objects may be compared to the height, width, and/or shape of the tracking object and the object with the closest height, width, and/or shape as the tracking object in a prior video frame may be selected as the tracking object in the subsequent video frame.

In some implementations, the tracking size may be updated with the size of the object identified as the tracking object in the subsequent video frame for the next identification of the tracking object. Once an object in a video frame is identified as being the tracking object, the tracking size may be updated with the size of the object identified as the tracking object for use in the next video frame that is analyzed to identify the tracking object.

In some implementations, responsive to none of the objects depicted in a subsequent video frame being identified as the tracking object, a new tracking object may be selected in the subsequent video frame. Based on none of the objects depicted in a subsequent video frame having a size with the threshold size of the tracking size, a new tracking object may be selected in the subsequent video frame. The new tracking object may be manually and/or automatically selected. The new tracking object may be selected using the same criteria used to select the original tracking object in the initial video frame (e.g., selection of the biggest object in the initial video frame and in the subsequent video frame as the tracking object). The new tracking object may be selected using different criteria than used to select the original tracking object in the initial video frame. The new tracking object may be selected from the same type of object as the original tracking object (e.g., selection of a face in the initial video frame and in the subsequent video frame as the tracking object).

In some implementations, responsive to none of the objects depicted in the subsequent video frame being identified as the tracking object, the identification of the tracking object for the subsequent video frame may be skipped. Based on none of the objects depicted in a subsequent video frame having a size with the threshold size of the tracking size, the tracking object may not be identified in the subsequent video frame. For the video frames in which the tracking object is not identified, the framing may be performed based on the identification of the tracking object in nearby/adjacent video frame(s).

In some implementations, one or more of the objects depicted in a subsequent video frame may be filtered out from being considered as the tracking object based on classification of the object(s). The classification of an object may determine the type of the object, and the type of the object may be used to filter the object out from being identified as the tracking object. For example, an object may be filtered out based on the object not being an object of interest. Objects of non-interest depicted in the video frame may be automatically filtered out from being identified as the tracking object. For example, objects of interest may include persons or faces, and other types of objects depicted in the video frame may not be considered as a potential tracking object. Filtering out objects from being considered as the tracking object may simplify the tracking process. Filtering out objects from being considered as the tracking object may reduce the amount of analysis/processing needed to be performed to identify the tracking object.

The framing component 110 may be configured to determine framing of the video for presentation. Determining framing of the video may include determining framing of the visual content/video frames of the video. Determining framing of the video may include ascertaining, calculating, computing, establishing, finding, setting, and/or otherwise determining the framing of the video. Framing of the video may be determined for a temporal part of the video or for the entire progress length of the video.

The framing of the video for presentation may refer to how the visual content/video frames of the video is manipulated for presentation and/or included in a video clip. The framing of the video may define positioning of a viewing window for the visual content/video frames within the video. The framing of the video may define where and how the viewing window is placed within the field of view of the visual content/video frames.

A viewing window may define the extents of the visual content/video frames to be included within a presentation of the video and/or included within a video clip. A viewing window may define extents of the visual content/video frames to be included within a punchout of the visual content/video frames. A punchout of visual content/video frames may refer to an output of one or more portions of the visual content/video frames for presentation (e.g., current presentation, future presentation based on video generated using the punchout). A punchout of the visual content/video frames may refer to extents of the visual content/video frames that is obtained for viewing and/or extraction. The extents of the visual content/video frames viewable/extracted within the viewing window may be used to provide views of different spatial parts of the visual content/video frames.

A punchout of visual content/video frames may include output of a virtual camera. A virtual camera may define one or more spatial extents of the visual content/video frames to be output (e.g., for presentation, for storage) based on orientation of the virtual camera with respect to the visual content/video frames of the video. A virtual camera may represent the point of view from which different spatial extents of the visual content/video frames are observed. Different punchouts of the visual content/video frames may include outputs of different virtual cameras to provide views of differential spatial parts of the visual content/video frames.

Positioning of a viewing window within the field of view of the visual content may refer to placement of the viewing window within the field of view of the visual content/video frames. The positioning/placement of the viewing window may be defined by one or more of viewing direction, viewing size, viewing rotation, and/or other information. Individual framing of the visual content/video frames may define (e.g., determine, establish, include, set) positioning of the viewing window within the field of view of the visual content/video frames based on the corresponding viewing direction, viewing size, viewing rotation, and/or other information. An individual framing of the visual content/video frames may define arrangement of pixels within the viewing window for presentation. The arrangement of the pixels within the viewing window may be defined by viewing projection and/or other information. Individual framing of the visual content/video frames may define corresponding viewing projection of the visual content/video frames within the viewing window.

A viewing direction may define a direction of view for a viewing window. A viewing direction may define the angle/visual portion of the visual content/video frame at which a viewing window may be directed. A viewing size may define the size of the viewing window. A viewing size may define a size (e.g., size, magnification, viewing angle) of viewable extents of visual content/video frame within the viewing window. A viewing size may define the dimension/shape of the viewing window. A viewing rotation may define a rotation of the viewing window. A viewing rotation may define one or more rotations of the viewing window about one or more axis. A viewing projection may define how pixels within the viewing window is arranged for presentation on an electronic display. A viewing projection may define how the pixels of an image are arranged to form the visual content. A viewing projection may refer to how portions of the visual content/video frame are mapped onto a surface (e.g., two-dimensional plane).

The framing of the video for presentation may be determined based on the identification of the tracking object in the video frames and/or other information. The framing of the video for presentation based on the identification of the tracking object in the video frames may include framing of the video for presentation based on information relating to the identification of the tracking object in the video frames. For example, a video frame of the video may be framed based on the type of the object that is tracked within the video frame, the location (e.g., position, rotation) of the object tracked within the video frame, the size of the object tracked within the video frame, and/or other information relating to the object tracked within the video frame. Criteria used to frame the video may remain the same throughout the video or change throughout the video.

In some implementations, the determination of the framing of the video for presentation based on the identification of the tracking object in the video frames may include positioning of a viewing window for the video to include the tracking object. The viewing window may be positioned within the video frames to include the tracking object. The viewing window may be positioned within the video frames to include the tracking object at the center of the viewing window, within a center region of the viewing window, at other point of the viewing window, and/or within other region of the viewing window. For example, FIG. 5 illustrates example framing of video frames 510, 520 based on the identification of the tracking object 550 in the video frames 510, 520. The viewing window 500 may be positioned within the video frames 510, 520 to include the tracking object 550 within the viewing window 500. The viewing window 500 may be positioned to include the tracking object 550 at the center/in the center area of the viewing window 500 or at other positions in the viewing window 500. Other framing of videos are contemplated.

In some implementations, determination of the framing of a video may include determination of a viewing direction for the viewing window within the video frames. The identification of the tracking object within a video frame (e.g., location and/or size of the tracking object) may be used to determine the viewing direction for the video frame. The identification of the tracking object within a video frame may be used to determine the direction of placement for the viewing window within the video frame.

In some implementations, determination of the framing of a video may further include determination of a viewing size for the viewing window within the video frames. Information relating to the identification of the tracking object in the video frames may be used to determine how much of the field of view of the visual content/video frame will be included within the viewing window.

The framing of the video may be used to generate a presentation of the video. The visual content/video frames of the video within the viewing window may be presented on one or more electronic displays. The visual content/video frames of the video within the viewing window may be used to generate a video clip (e.g., 2D video, video summary, video edit). The video clip may be stored in the electronic storage 13.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the electronic display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of the computer program components may provide more or less functionality than is described. For example, one or more of the computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
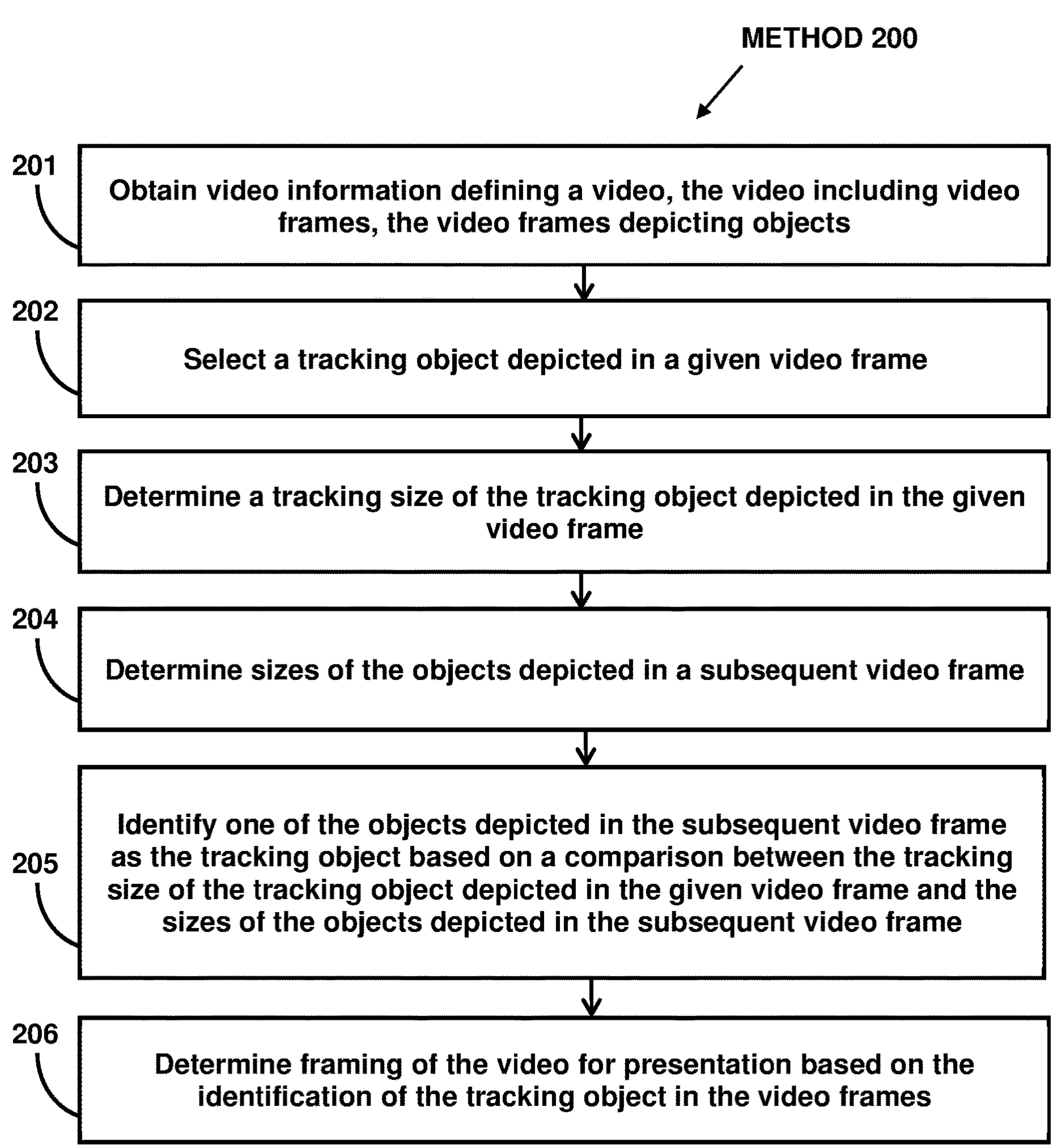
FIG. 2 illustrates an example method for tracking objects in videos.

FIG. 2 illustrates method 200 for tracking objects in videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video. The video may include video frames. The video frames may depict objects. In some implementations, operation 201 may be performed by a processor component the same as or similar to the video component 102 (Shown in FIG. 1 and described herein).

At operation 202, a tracking object depicted in a given video frame may be selected. In some implementations, operation 202 may be performed by a processor component the same as or similar to the selection component 104 (Shown in FIG. 1 and described herein).

At operation 203, a tracking size of the tracking object depicted in the given video frame may be determined. In some implementations, operation 203 may be performed by a processor component the same as or similar to the size component 106 (Shown in FIG. 1 and described herein).

At operation 204, sizes of the objects depicted in a subsequent video frame may be determined. In some implementations, operation 204 may be performed by a processor component the same as or similar to the size component 106 (Shown in FIG. 1 and described herein).

At operation 205, one of the objects depicted in the subsequent video frame may be identified as the tracking object based on a comparison between the tracking size of the tracking object depicted in the given video frame and the sizes of the objects depicted in the subsequent video frame and/or other information. In some implementations, operation 205 may be performed by a processor component the same as or similar to the tracking component 108 (Shown in FIG. 1 and described herein).

At operation 206, framing of the video for presentation may be determined based on the identification of the tracking object in the video frames and/or other information. In some implementations, operation 206 may be performed by a processor component the same as or similar to the framing component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for object tracking in videos, the system comprising:

one or more physical processors configured by machine-readable instructions to:

obtain video information defining a spherical video, the spherical video including video frames, the video frames depicting objects;

select a tracking object depicted in a given one of the video frames;

determine a tracking size of the tracking object depicted in the given one of the video frames;

determine sizes of the objects depicted in a subsequent video frame, the subsequent video frame depicting a first object having a given size;

identify one of the objects depicted in the subsequent video frame as the tracking object based on size differences between the tracking size of the tracking object depicted in the given one of the video frames and the sizes of the objects depicted in the subsequent video frame, wherein the first object is identified as the tracking object based on a difference between the given size and the tracking size being less than a threshold size difference, further wherein the tracking size is updated with the given size in the subsequent video frame for next identification of the tracking object; and determine framing of the spherical video for presentation based on the identification of the tracking object in the video frames.

2. The system of claim 1, wherein responsive to none of the objects depicted in the subsequent video frame being identified as the tracking object:

a new tracking object is selected in the subsequent video frame; or the identification of the tracking object for the subsequent video frame is skipped.

3. A system for object tracking in videos, the system comprising:

one or more physical processors configured by machine-readable instructions to:

obtain video information defining a video, the video including video frames, the video frames depicting objects;

select a tracking object depicted in a given one of the video frames;

determine a tracking size of the tracking object depicted in the given one of the video frames;

determine sizes of the objects depicted in a subsequent video frame;

identify one of the objects depicted in the subsequent video frame as the tracking object based on a comparison between the tracking size of the tracking object depicted in the given one of the video frames and the sizes of the objects depicted in the subsequent video frame; and determine framing of the video for presentation based on the identification of the tracking object in the video frames.

4. The system of claim 3, wherein:

the subsequent video frame depicts a first object having a given size;

the first object is identified as the tracking object based on a difference between the given size and the tracking size being less than a threshold size difference; and the first object is not identified as the tracking object based on the difference between the given size and the tracking size being greater than the threshold size difference.

5. The system of claim 4, wherein responsive to none of the objects depicted in the subsequent video frame being identified as the tracking object, a new tracking object is selected in the subsequent video frame.

6. The system of claim 4, wherein responsive to none of the objects depicted in the subsequent video frame being identified as the tracking object, the identification of the tracking object for the subsequent video frame is skipped.

7. The system of claim 3, wherein a first object in the subsequent video frame with a smallest size difference with the tracking size is identified as the tracking object in the subsequent video frame.

8. The system of claim 7, wherein the tracking size is updated with a given size of the first object identified as the tracking object in the subsequent video frame for next identification of the tracking object.

9. The system of claim 3, wherein one or more of the objects depicted in the subsequent video frame are filtered out from being considered as the tracking object based on classification of the one or more objects.

10. The system of claim 3, wherein the determination of the framing of the video for presentation based on the identification of the tracking object in the video frames includes positioning of a viewing window for the video to include the tracking object.

11. The system of claim 3, wherein the video includes a spherical video.

12. A method for object tracking in videos, the method performed by a computing system including one or more processors, the method comprising:

obtaining, by the computing system, video information defining a video, the video including video frames, the video frames depicting objects;

selecting, by the computing system, a tracking object depicted in a given one of the video frames;

determining, by the computing system, a tracking size of the tracking object depicted in the given one of the video frames;

determining, by the computing system, sizes of the objects depicted in a subsequent video frame;

identifying, by the computing system, one of the objects depicted in the subsequent video frame as the tracking object based on a comparison between the tracking size of the tracking object depicted in the given one of the video frames and the sizes of the objects depicted in the subsequent video frame; and determining, by the computing system, framing of the video for presentation based on the identification of the tracking object in the video frames.

13. The method of claim 12, wherein:

the subsequent video frame depicts a first object having a given size;

the first given object is identified as the tracking object based on a difference between the given size and the tracking size being less than a threshold size difference; and the first object is not identified as the tracking object based on the difference between the given size and the tracking size being greater than the threshold size difference.

14. The method of claim 13, wherein responsive to none of the objects depicted in the subsequent video frame being identified as the tracking object, the identification of the tracking object for the subsequent video frame is skipped.

15. The method of claim 12, wherein responsive to none of the objects depicted in the subsequent video frame being identified as the tracking object, a new tracking object is selected in the subsequent video frame.

16. The method of claim 12, wherein a first object in the subsequent video frame with a smallest size difference with the tracking size is identified as the tracking object in the subsequent video frame.

17. The method of claim 16, wherein the tracking size is updated with a given size of the first object identified as the tracking object in the subsequent video frame for next identification of the tracking object.

18. The method of claim 12, wherein one or more of the objects depicted in the subsequent video frame are filtered out from being considered as the tracking object based on classification of the one or more objects.

19. The method of claim 12, wherein determining the framing of the video for presentation based on the identification of the tracking object in the video frames includes positioning of a viewing window for the video to include the tracking object.

20. The method of claim 12, wherein the video includes a spherical video.

* * * * *